United States Patent
Arakawa

(10) Patent No.: US 8,102,247 B2
(45) Date of Patent: Jan. 24, 2012

(54) MOVING OBJECT MONITORING DEVICE AND MOVING OBJECT MONITORING SYSTEM

(75) Inventor: Shuuji Arakawa, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 477 days.

(21) Appl. No.: 12/223,035

(22) PCT Filed: Jan. 30, 2007

(86) PCT No.: PCT/JP2007/051490
§ 371 (c)(1),
(2), (4) Date: Jul. 21, 2008

(87) PCT Pub. No.: WO2007/091449
PCT Pub. Date: Aug. 16, 2007

(65) Prior Publication Data
US 2010/0229782 A1    Sep. 16, 2010

(30) Foreign Application Priority Data

Feb. 6, 2006    (JP) .................................. 2006-028416

(51) Int. Cl.
*B60R 25/10* (2006.01)
(52) U.S. Cl. ................................ 340/426.1; 340/426.11
(58) Field of Classification Search .................... 116/33; 340/426.1, 430, 429, 426.11, 426.12, 426.19, 340/457, 457.4, 539.13, 576, 3.1; 701/213
See application file for complete search history.

(56) References Cited

U.S. PATENT DOCUMENTS

| 4,023,138 | A | * | 5/1977 | Ballin | 180/287 |
| 4,645,939 | A | * | 2/1987 | Robinson | 307/10.4 |
| 5,349,329 | A | * | 9/1994 | Smith | 340/539.21 |
| 5,396,215 | A | * | 3/1995 | Hinkle | 340/426.17 |
| 5,459,448 | A | * | 10/1995 | Dortenzio et al. | 340/426.11 |
| 5,477,206 | A | * | 12/1995 | Rodriguez, Sr. | 340/430 |
| 5,604,384 | A | * | 2/1997 | Carlo et al. | 307/10.5 |
| 5,638,044 | A | * | 6/1997 | Chua | 340/426.12 |
| 5,757,773 | A | * | 5/1998 | Tsuji | 370/241 |
| 6,204,772 | B1 | * | 3/2001 | DeMay et al. | 340/686.1 |

(Continued)

FOREIGN PATENT DOCUMENTS

JP          62-094443         4/1987

(Continued)

OTHER PUBLICATIONS

International Search Report mailed Apr. 10, 2007, issued on PCT/JP2007/051490.

*Primary Examiner* — R. A. Smith
*Assistant Examiner* — Tania Courson
(74) *Attorney, Agent, or Firm* — Edwards Wildman Palmer LLP

(57) ABSTRACT

The present invention is provided to suppress an increase of communication cost, immediately detect theft and illegal use of a moving object, and immediately deal with the theft and illegal use. A moving object monitoring device 10 is installed in a moving object 1, and transmits moving object information 15 of the moving object 1 to a managing server 4 which controls the moving object 1. The moving object monitoring device 10 includes a control unit 11 which transmits the moving object information 15 such that a transmission interval is shorter when a startup lock function for prohibiting the startup of the moving object is on than a transmission interval when the startup lock function is deactivated.

8 Claims, 5 Drawing Sheets

U.S. PATENT DOCUMENTS

| | | | |
|---|---|---|---|
| 6,225,890 B1* | 5/2001 | Murphy | 340/426.19 |
| 6,504,472 B2* | 1/2003 | Machala et al. | 340/426.1 |
| 6,621,411 B2* | 9/2003 | McCarthy et al. | 340/425.5 |
| 6,803,854 B1* | 10/2004 | Adams et al. | 340/531 |
| 6,833,785 B2* | 12/2004 | Brown et al. | 340/426.12 |
| 6,861,947 B2* | 3/2005 | Albert | 340/426.11 |
| 7,002,465 B2* | 2/2006 | Komatsu et al. | 340/531 |
| 7,502,687 B2* | 3/2009 | Flick | 701/213 |
| 7,656,278 B2* | 2/2010 | Onishi et al. | 340/426.12 |
| 7,860,517 B1* | 12/2010 | Patoskie et al. | 455/456.1 |
| 7,873,455 B2* | 1/2011 | Arshad et al. | 701/50 |
| 2002/0163418 A1* | 11/2002 | Nemoto | 340/5.2 |
| 2005/0046554 A1* | 3/2005 | Atthaprasith | 340/426.1 |
| 2005/0184858 A1* | 8/2005 | Griffin et al. | 340/426.11 |
| 2005/0242971 A1* | 11/2005 | Dryer | 340/870.11 |
| 2006/0109090 A1 | 5/2006 | Komatsu et al. | |
| 2010/0134275 A1* | 6/2010 | Fitzgerald et al. | 340/539.13 |
| 2010/0253491 A1* | 10/2010 | Grossman | 340/426.11 |

FOREIGN PATENT DOCUMENTS

| | | |
|---|---|---|
| JP | 07-006299 | 1/1995 |
| JP | 07-123042 | 5/1995 |
| JP | 08-136639 | 5/1996 |
| JP | 11-007599 | 1/1999 |
| JP | 2001-191901 A | 7/2001 |
| JP | 2002-331914 A | 11/2002 |
| JP | 2003-291784 | 10/2003 |
| JP | 2003-317177 | 11/2003 |
| JP | 2004-086349 | 3/2004 |
| JP | 2004-199167 | 7/2004 |
| JP | 2004-276802 | 10/2004 |
| JP | 2005-082006 A | 3/2005 |
| JP | 2005-088786 | 4/2005 |
| JP | 2006-015998 | 1/2006 |
| WO | WO-00/55827 | 9/2000 |

* cited by examiner

MOVING OBJECT MONITORING DEVICE AND MOVING OBJECT MONITORING SYSTEM

TECHNICAL FIELD

The present invention relates to a moving object monitoring device which remotely monitors a moving object such as construction machinery to which the device is installed, and also relates to a moving object monitoring system including the same.

BACKGROUND ART

Conventionally, a moving object monitoring system has a moving object monitoring device installed in a moving object such as construction machinery to monitor the moving object. The moving object monitoring device transmits to a management unit side, moving object information such as a location, operational status, condition of a moving object. Based on the moving object information, the management unit immediately notifies to a manager the need of replacing components which is maintained regularly, and any problems occurring, which allows the manager to cope with the problems immediately and properly.

Patent Document 1: Japanese Patent Application Laid-Open No. H7-123042
Patent Document 2: Japanese Patent Application Laid-Open No. H11-7599
Patent Document 3: Japanese Patent Application Laid-Open No. H8-136639
Patent Document 4: Japanese Patent Application Laid-Open No. S62-94443
Patent Document 5: Japanese Patent Application Laid-Open No. H7-6299
Patent Document 6: PCT International Publication No. 00/55827

DISCLOSURE OF INVENTION

Problem to be Solved by the Invention

The conventional monitoring device above, however, generally transmits moving object information to the management unit side at regular intervals, for example, once a day or once a week, or only when the location of the moving object changes.

On the other hand, the management unit side transmits a startup lock command to a specific moving object, based on received moving object information including location information and operation information of the moving object, and on-site information of the moving object. The startup lock function forcibly prohibits the restart of engine or the like of the moving object in order to prevent theft of a moving object or illegal use of a rented moving object outside a contract. The moving object monitoring device forcibly prohibits the startup of the moving object in response to the received startup lock command, and transmits to the management unit side the startup-locked status of the moving object as moving object information.

The moving object monitoring device, however, transmits moving object information at long transmission intervals as mentioned above even after receiving the startup lock command. Hence, disadvantageously, the response to deal with theft and illegal use of the moving object tends to delay. Meanwhile, setting the transmission interval short increases the communication cost.

The present invention is made in view of the above problems and an object of the present invention is to provide a moving object monitoring device and moving object monitoring system including the same to immediately detect theft and illegal use of a moving object and immediately deal with the theft and illegal use, without a great increase of communication cost.

Means for Solving Problem

In order to solve the problems above and to attain an object, a moving object monitoring device according to the present invention is installed in a moving object to be monitored and transmits moving object information of the moving object to a management unit that controls the moving object. The moving object monitoring device includes a control unit that controls transmission of the moving object information to the management unit such that a transmission condition applied when a startup lock function for prohibiting startup of the moving object is activated is different from a transmission condition applied when the startup lock function is deactivated.

Further, in the moving object monitoring device according to the present invention, in an aspect of the present invention as described above, the control unit transmits the moving object information such that a transmission interval of the moving object information is shorter than a transmission interval applied when the startup lock function is deactivated.

Further, in the moving object monitoring device according to the present invention, in an aspect of the present invention as described above, the control unit transmits the moving object information when both conditions are satisfied: a moving distance of the moving object is longer than a predetermined distance, and an engine is off.

Further, in the moving object monitoring device according to the present invention, in an aspect of the present invention as described above, the startup lock function is a function for prohibiting startup of the moving object in response to a lock command transmitted from the management unit for prohibiting the startup of the moving object.

Further, in the moving object monitoring device according to the present invention, in an aspect of the present invention as described above, the startup lock function is one or both of a function for prohibiting startup of an engine of the moving object and a function for prohibiting an operation of a working actuator of the moving object.

Further, a moving object monitoring system according to the present invention includes a management unit that monitors a moving object to be monitored, and a moving object monitoring device installed in each moving object and transmitting moving object information of the moving object to the management unit. Moreover, the moving object monitoring device includes a control unit that controls transmission of the moving object information to the management unit such that a transmission condition applied when a startup lock function for prohibiting startup of the moving object is activated is different from a transmission condition applied when the startup lock function is deactivated. Moreover, the management unit monitors a condition of each moving object based on the moving object information transmitted from each moving object monitoring device.

Further, in the moving object monitoring system according to the present invention, in an aspect of the present invention as described above, the control unit transmits the moving object information such that a transmission interval of the moving object information is shorter than a transmission interval applied when the startup lock function is deactivated, and the management unit performs an alert process to alert a manager that a problem may have happened to the moving object when the startup lock function is on and no moving object information is received over a predetermined period.

Further, in the moving object monitoring system according to the present invention, in an aspect of the present invention as described above, the control unit transmits the moving object information when a moving distance of the moving object is longer than a predetermined distance and an engine is off, and the management unit performs, upon receiving the moving object information, the alert process to alert the manager that a problem may have happened to the moving object.

Further, in the moving object monitoring system according to the present invention, in an aspect of the present invention as described above, the management unit transmits to the moving object monitoring device of a specific one of the moving objects, a lock command for prohibiting startup of the specific moving object or a lock deactivation command for deactivating the startup lock function of the specific moving object, and the moving object monitoring device of the specific one of the moving objects activates the startup lock function of the specific one of the moving objects in response to the lock command, and deactivates the startup lock function of the specific one of the moving objects in response to the lock deactivation command.

Further, in the moving object monitoring system according to the present invention, in an aspect of the present invention as described above, the startup lock function is one or both of a function for prohibiting startup of an engine of the moving object and a function for prohibiting an operation of a working actuator of the moving object.

EFFECT OF THE INVENTION

In the moving object monitoring device and moving object monitoring system according to the present invention, the control unit transmits the moving object information to the management unit side such that a transmission condition applied when the startup lock function for prohibiting the startup of the moving object is on is different from a transmission condition applied when the startup lock function of the moving object is deactivated, for example, such that a transmission interval of the moving object information is shorter when the startup lock function is on than when the startup lock function is deactivated. The monitoring of theft and illegal use of moving objects is strengthened in such a way that the increase of communication cost can be suppressed, theft and illegal use of the moving object can be immediately detected, and the response against theft or illegal use can be immediately taken.

DESCRIPTION OF THE NUMERALS

Figure 1:
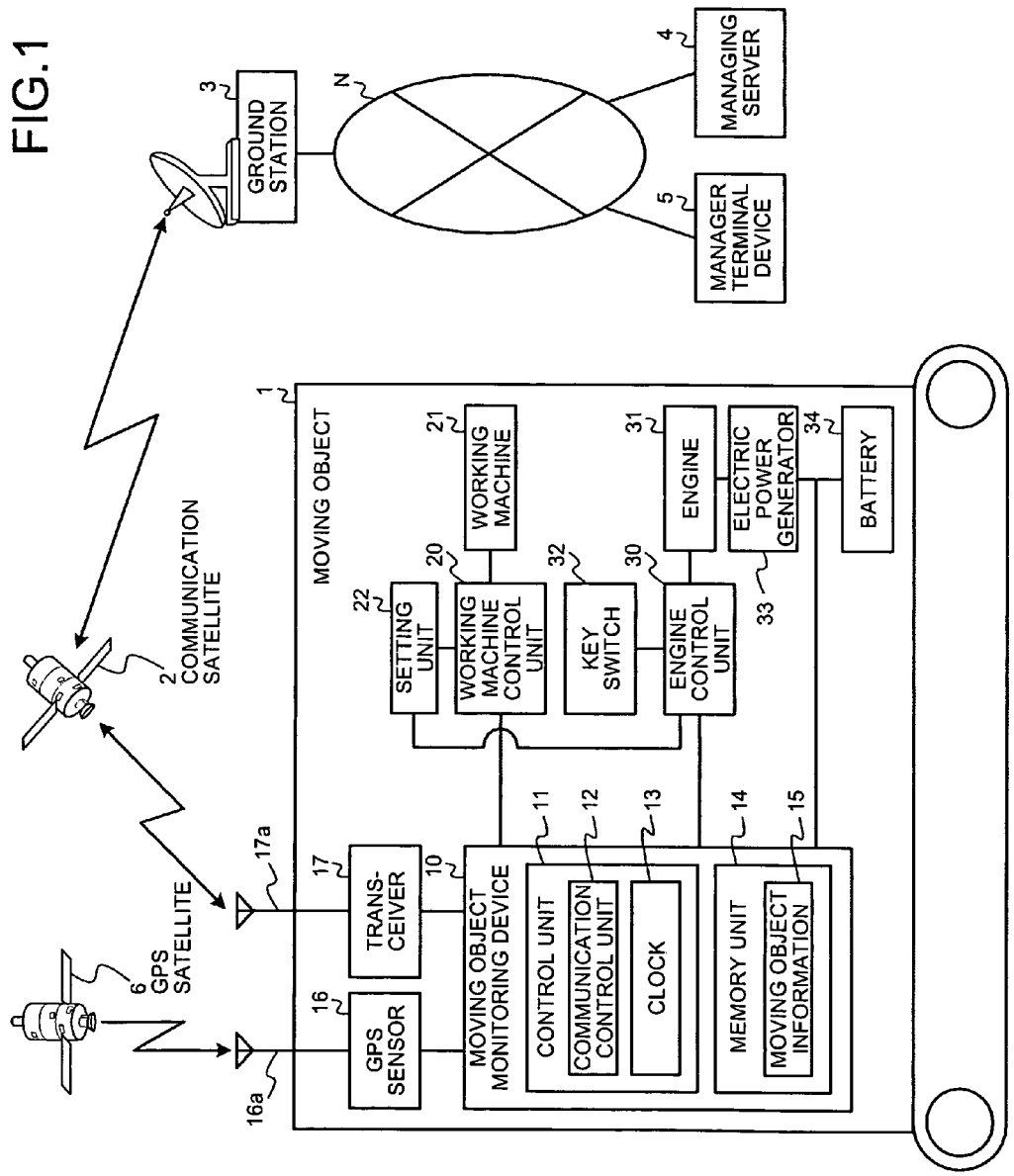
FIG. 1 is a schematic diagram showing a configuration of a moving object monitoring system including a moving object monitoring device according to a first embodiment of the present invention.

1 Moving object
2 Communication satellite
3 Ground station
4 Managing server
5 Manager terminal device
6 GPS satellite
10 Moving object monitoring device
11 Control unit
12 Communication control unit
13 Clock
14 Memory unit
15 Moving object information
16 GPS sensor
16a, 17a Antenna
17 Transceiver
20 Working machine control unit
21 Working machine
22 Setting unit
30 Engine control unit
31 Engine
32 Key switch
33 Electric power generator
34 Battery
N Network

BEST MODE FOR CARRYING OUT THE INVENTION

Exemplary embodiments of a moving object monitoring device and a moving object monitoring system according to the present invention are described below.

First Embodiment

FIG. 1 is a diagram of an overall configuration of a moving object monitoring system including a moving object monitoring device according to a first embodiment of the present invention. In the moving object monitoring system, a plurality of moving objects 1 such as construction machinery is geographically scattered. Each of the moving objects 1 is connected to a managing server 4 for communication via a communication satellite 2, a ground station 3, and a network N such as the Internet. The network N has a connection to a manager terminal device 5, which is a terminal of a manager of the moving object 1. The moving object 1 transmits to the managing server 4, moving object information, which is vehicle information including location information and operation information indicating operation time and operation condition of the moving object.

The moving object 1 has a moving object monitoring device 10 and is connected to a GPS sensor 16 and a transceiver 17. The GPS sensor 16 tracks self-location information based on information transmitted from a plurality of GPS satellites 6 via an antenna 16a, and then the moving object monitoring device 10 acquires the self-location information. The transceiver 17 is connected to the communication satellite 2 via an antenna 17a and performs a transmission/reception process between the managing server 4 and the moving object monitoring device 10.

The moving object 1 has a working machine 21 such as a packet, drive control of which is managed by a working machine control unit 20. The moving object 1 also has an engine 31, drive control of which is managed by an engine control unit 30. The engine 31 is a driving source of a vehicle travel and is connected to an electric power generator 33 (i.e. an alternator) for the accumulation of electricity on a battery 34. A setting unit 22, used by the user of the moving object 1, performs various kinds of setting of the working machine 21: working operation lock to stop the driving, and engine lock to prohibit the restart of the engine. A key switch 32 turns electrical components on and generates an engine startup signal.

The moving object monitoring device 10 is connected to the working machine control unit 20 and the engine control unit 30, to acquire operation information of the work machine and the engine, and to store the acquired operation information on a memory unit 14 as a part of moving object information 15. The moving object monitoring device 10 monitors output voltage of the electric power generator 33 to acquire operation information indicating whether the engine 31 is on or not, and store the acquired information on the memory unit 14 as a part of the moving object information 15. The moving object information 15 includes location information acquired from the GPS sensor 16. Further, the moving object information 15 includes contents of commands transmitted from the managing server 4 side. Specifically, when the managing server 4 transmits a startup lock command for prohibiting the startup of the engine to the moving object and the moving object monitoring device 10 receives the transmitted startup lock command, the control unit 11 carries out startup lock on the targeted moving object and stores the locked state as a part of moving object information on the memory unit 14. Locked states set by the setting unit 22 are also stored as moving object information.

As described above, the managing server 4 can transmit to the moving object 1 the startup lock command, for example, which prohibits the restart of the engine. On receiving this startup lock command, the moving object monitoring system 10 can forcibly prohibit the restart of the engine 31 by constantly blocking off startup signals which cause the restart of the engine 31. The managing server 4 can also transmit a deactivation command, which deactivates the startup lock. Here in the description, a startup lock is a concept that covers both the operation lock and the engine lock mentioned above, and also covers the operation lock and the engine lock by the setting unit 22, i.e., a lock performed manually by the user, and a remote lock performed through transmission from the managing server 4. Further, the startup lock covers a preset lock, which activates operation lock and engine lock at a preset time.

The control unit 11 includes a communication control unit 12 and a clock 13, and, under the control by the communication control unit 12, transmits acquired moving object information 15 to the managing server 4 side.

Control process procedures in the control unit 11 are described below referring to the flowchart in FIG. 2. As an example of the startup locks, the following describes a case where the engine is locked by a startup lock command transmitted from the managing server 4.

Figure 2:
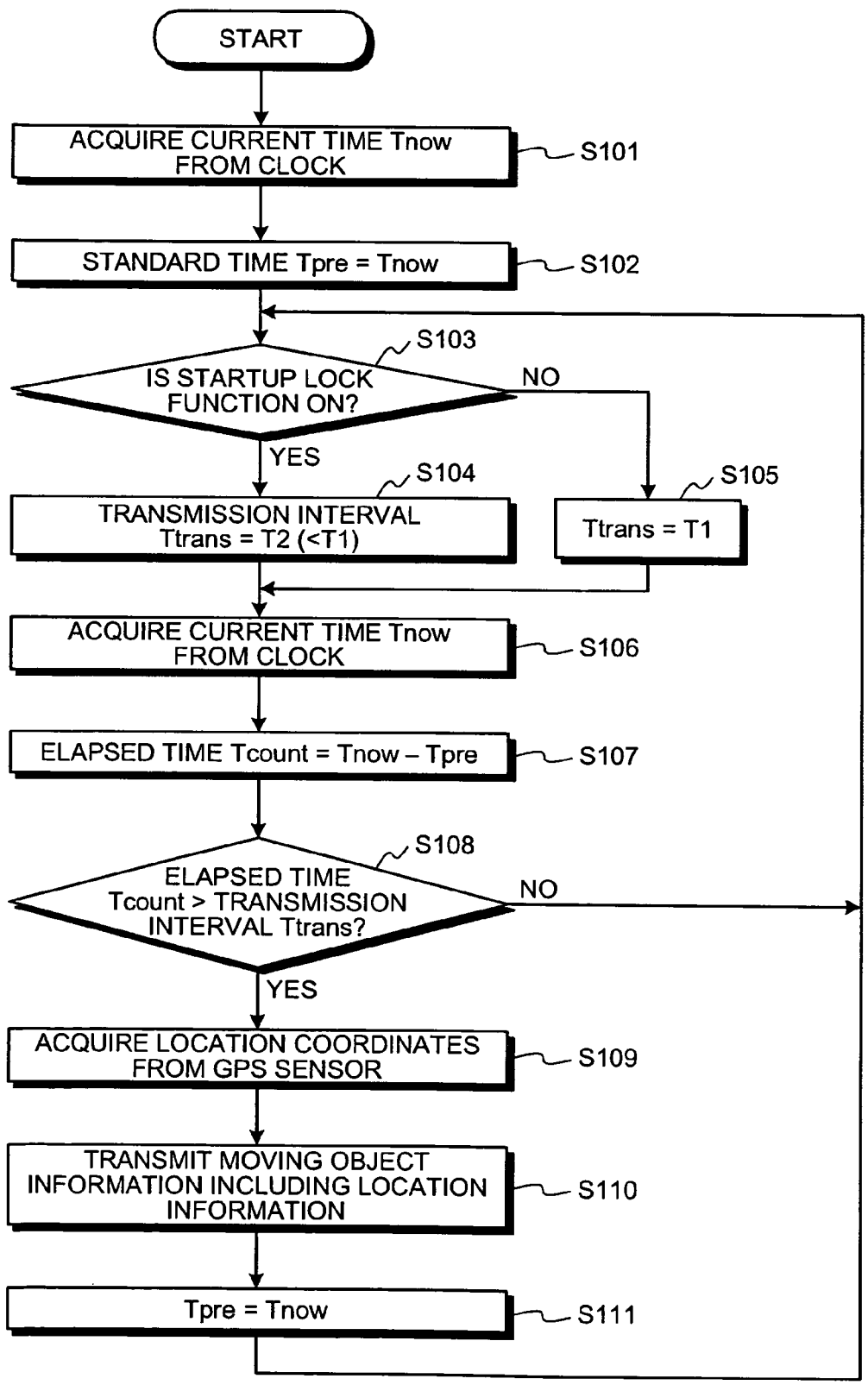
FIG. 2 is a flowchart showing transmission control procedures of moving object information by a control unit in the moving object monitoring device shown in FIG. 1.

Referring now to FIG. 2, the control unit 11 acquires current time Tnow from the clock 13 (Step S101), and assigns the acquired current time Tnow to standard time Tpre (Step S102). Thereafter the control unit 11 refers to the startup lock state in the moving object information 15 in the memory unit 14, and determines whether the startup lock function is on (Step S103). If the startup lock function is on (Step S103, Yes), transmission interval Ttrans for transmitting the moving object information 15 to the managing server 4 is set at interval T2 (Step S104). If the startup lock function is off (Step S103, No), transmission interval Ttrans is set at interval T1 (Step S105), which is longer than interval T2.

Next, the control unit 11 acquires current time Tnow from the clock 13 (Step S106), subtracts the standard time Tpre from the acquired Tnow and assigns an obtained value to elapsed time Tcount (Step S107), then, determines whether the elapsed time Tcount is longer than the transmission interval set at Step S104 or 5105 (Step S108). If the elapsed time Tcount is longer than the transmission interval Ttrans (Step S108, Yes), the control unit 11 acquires location coordinates of the moving object 1 from the GPS sensor 16 (Step S109), then, the communication control unit 12 transmits the moving object information 15 including the acquired location information, i.e., the location coordinates, to the managing server 4 side via the transceiver 17 (Step S110). Next, the standard time Tpre is reset to new current time Tnow (Step S111). Then the control unit 11 returns to Step S103 and repeats the procedures described above. On the other hand, if the elapsed time Tcount is not longer than the transmission interval Ttrans (Step S108, No), the control unit 11 returns to Step S103 and repeats the procedures described above. Here, the transmission interval T2 is 30 minutes and the transmission interval T1 is 24 hours, for example.

As described above, the moving object monitoring device 10 assigns different values to the interval transmission of the moving object information 15 in response to the setting/deactivation of the startup lock as a trigger. The moving object monitoring device 10 makes the transmission interval shorter in a state where the startup lock is set than in a state where the startup lock is deactivated, and thereby strengthens the monitoring of the moving objects in the state where the startup lock is set. Since the transmission interval is longer in a state where the startup lock is deactivated than in a state where the startup lock is set, the number of transmissions of the moving object information 15 is reduced, whereby the significant increase in the communication cost can be prevented.

Figure 3:
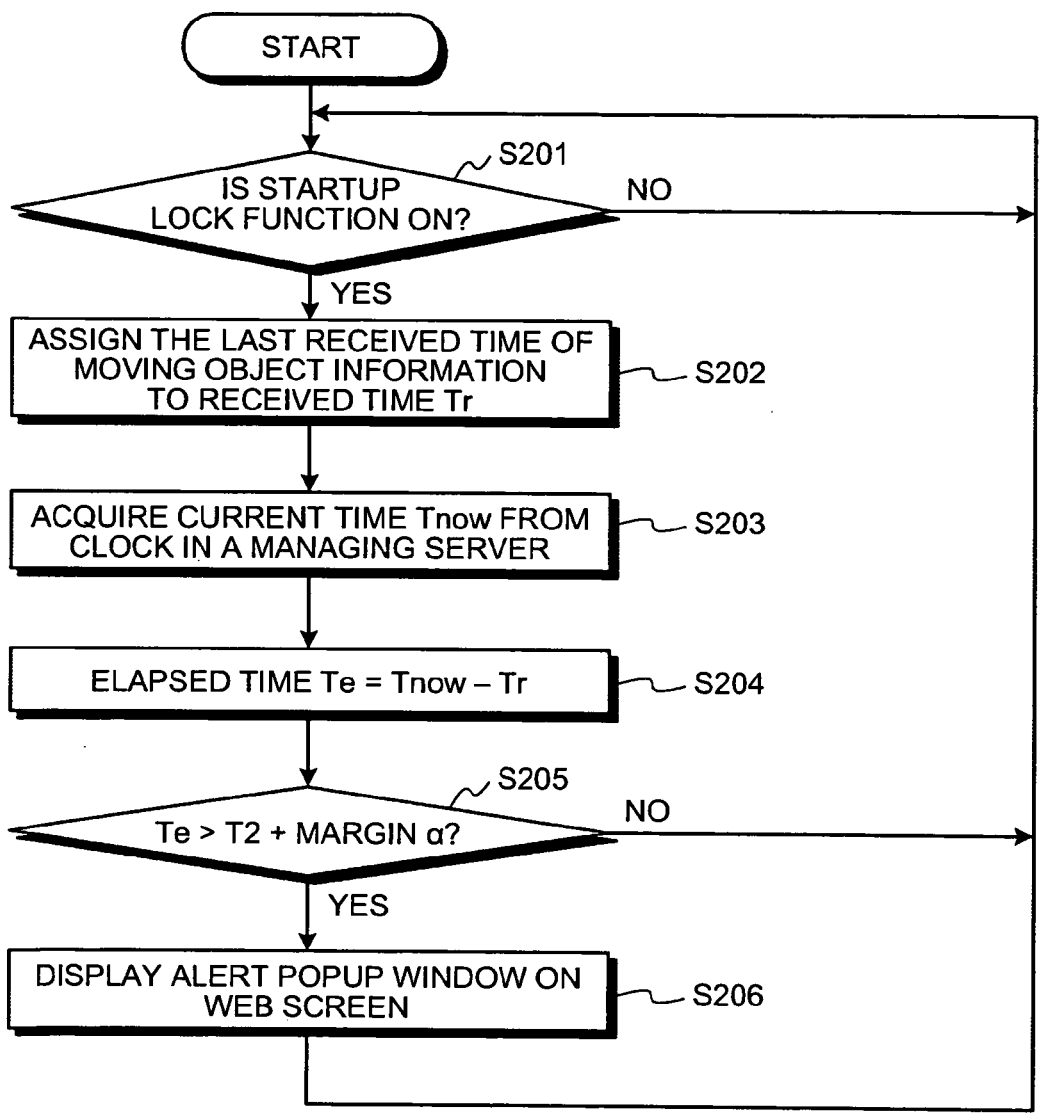
FIG. 3 is a flowchart showing one example of a procedure of a managing server shown in FIG. 1 for checking the chance of problems occurring.

FIG. 3 is a flowchart of management process procedures on the managing server 4 side. In FIG. 3, the managing server 4 determines whether the moving object monitoring device 10 keeps the startup lock function on or not (Step S201). If the startup lock function is on (Step S201, Yes), the managing server 4 assigns the last received time of the moving object information to received time Tr (Step S202), acquires current time Tnow from a clock in the managing server 4 (Step S203), subtracts the received time Tr from the current time Tnow, and then assigns the given value to elapsed time Te (Step S204). On the other hand, if the startup lock function is off (Step S201, No), the managing server 4 repeats the determination processes.

Figure 4:
FIG. 4 is an example of an alert popup display according to the processes for checking the chance of problems occurring illustrated in FIG. 3.

Next, the managing server 4 determines whether the elapsed time Te is longer than the value obtained by adding margin time α to transmission interval T2 (Step S205). If the elapsed time Te is longer than the obtained value (Step S205, Yes), an alert popup window as shown in FIG. 4 is displayed on a Web screen in the managing server 4, alerting that a serious problem such as theft has happened to the moving object (Step S206), and the procedure returns to Step S201. On the other hand, if the elapsed time Te is not longer than the value obtained by adding margin time a to transmission interval T2 (Step S205, No), the procedure returns to Step S201 and repeats the procedures above.

The alert popup window as shown in FIG. 4 displays the message "Vehicle No. 23RT-711 may have been stolen. Please check the site." In this case, the manager can see the alert by accessing the managing server 4 via the manager terminal device 5. Alternatively, an email of the same contents as the alert popup window can be forwarded directly to a mobile phone of the manager, for example, as an alert.

The manager, in any case, recognizes that it is highly likely that a serious problem such as theft has happened to the moving object 1 when the moving object 1 is in the startup locked state and the moving object information is not transmitted to the manager over a predetermined period (transmission interval T2+margin time α) or longer. Receiving no moving object information from a moving object over the predetermined period or longer implies that the moving object monitoring device or the transceiver 17 including the antenna 17a may be shut off by means of destruction or other means. Since the predetermined period is close to transmission interval T2, problems on the moving object can be immediately recognized.

Second Embodiment

A second embodiment of the present invention is described below. In the first embodiment described above, the transmission interval of the moving object information is set short when the moving object enters the startup lock state as a trigger, thereby strengthening the monitoring of moving objects. On the other hand, in the second embodiment, the moving object information is sent to the managing server 4 side, depending on a moving distance of the moving object, on/off state of the engine, in addition to the startup lock state.

Figure 5:
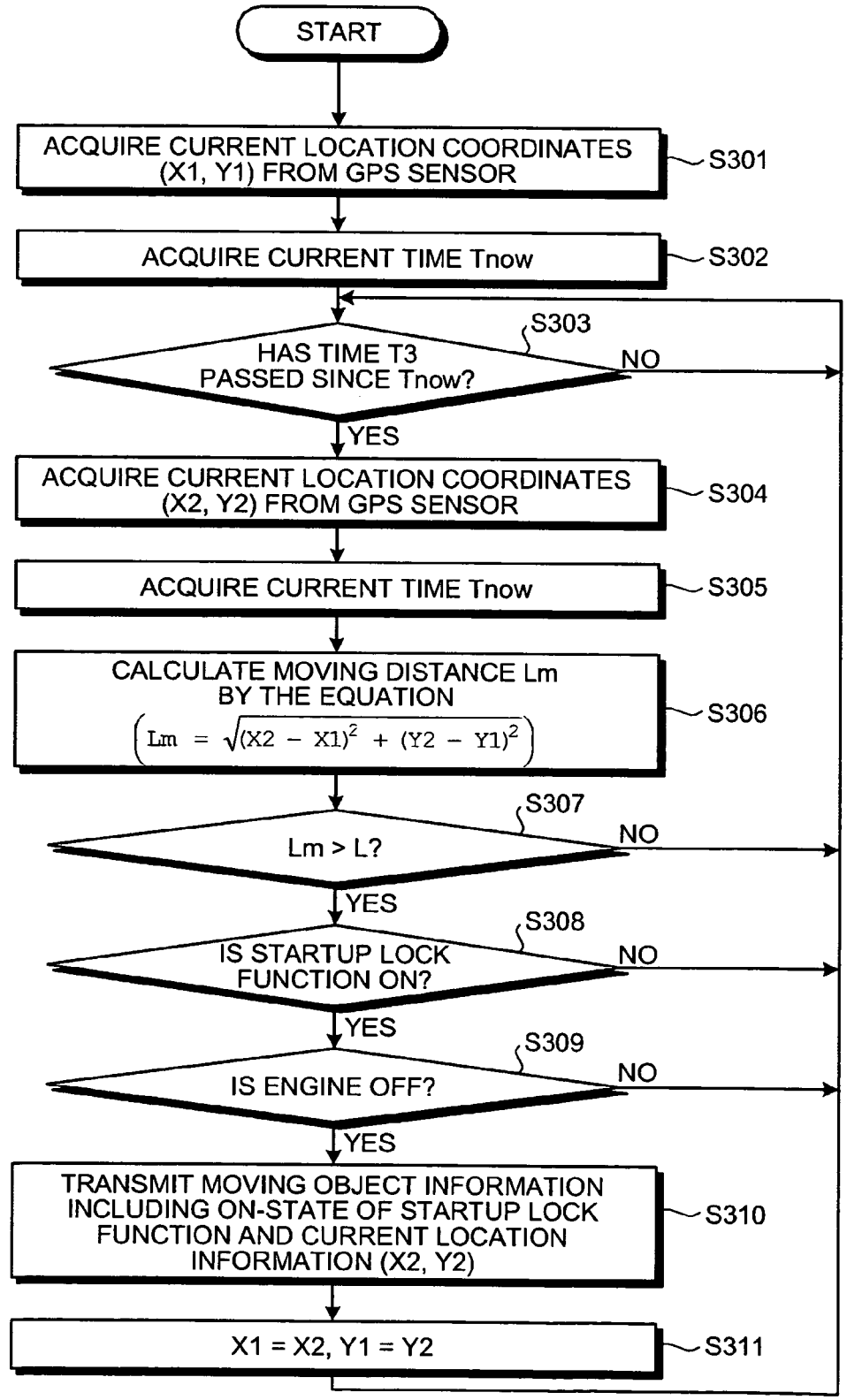
FIG. 5 is a flowchart showing transmission control procedures of a control unit in a moving object monitoring device for transmission of moving object information according to a second embodiment of the present invention.

A moving object monitoring system according to the second embodiment has substantially the same configuration as that shown in FIG. 1. The differences are the control procedures of the control unit 11 of the moving object monitoring device 10 and the control procedures of the managing server 4. FIG. 5 is a flowchart of the control procedures of the control 11 of the moving object monitoring device 10 according to the second embodiment of the present invention. Referring now to FIG. 5, the control unit 11 firstly acquires current location coordinates (X1, Y1) from the GPS sensor 16 (Step S301), and acquires current time Tnow from the clock 13 (Step S302).

Then, the control unit 11 determines whether time T3 has passed from the current time Tnow (Step S303). If the time T3 has not passed yet (Step 303, No), the control unit 11 repeats this determination process. On the other hand, if the time T3 has passed (Step S303, Yes), the control unit 11 acquires current location coordinates (X2, Y2) from the GPS sensor 16 (Step S304), and acquires new current time Tnow from the clock 13 and updates the current time Tnow (Step S305). Then, the control unit 11 calculates moving distance Lm by the equation $Lm=\sqrt{(X2-X1)^2+(Y2-Y1)^2}$, based on the location coordinates acquired at Steps 5301 and S304 (Step S306), and determines whether moving distance Lm of the moving object is longer than predetermined distance L (Step S307).

If moving distance Lm is longer than the predetermined distance L (Step S307, Yes), the control unit 11 determines whether the startup lock function is on or not (Step S308). If the startup lock function is on (Step S308, Yes), the control unit 11 determines further whether the engine is off (Step S309). As described above, the determination of the engine state is performed based on the monitored output voltage from the electric power generator 33. If no output voltage is monitored, the engine is determined to be off. The engine state here is stored and updated as the moving object information 15.

Only when the engine is off (Step 309, Yes), in other words, only when the moving distance Lm is longer than the predetermined distance L, and the startup lock function is on, and the engine is off, then, the control unit 11 transmits the moving object information to the managing server 4 side (Step S310). The moving object information here includes current location information and information indicating that a status of the startup lock function is on. Thereafter, the control unit 11 assigns the location coordinates (X1, Y1) to the location coordinates (X2, Y2), then returns to Step S303, and repeats the procedures described above. On the other hand, when the moving distance Lm is not longer than the predetermined distance L (Step S307, No), or when the startup lock function is not on (Step S308, No), or when the engine is not off (Step 309, No), the control unit 11 returns to Step S303 and repeats the procedures described above.

In the embodiment above, the conditions to be met for transmitting the moving object information are: the moving distance Lm is longer than the predetermined distance L; and the engine is off. This is because it is likely that the moving object is loaded on a trailer and stolen in such a state. Therefore, by properly applying a different combination of conditions, specific problems can be immediately detected.

In addition to the control procedures shown in FIG. 5, the control unit 11 performs other procedures in parallel such as usual data transmission at regular intervals of 24 hours. These usual procedures of data transmission can be incorporated into the procedures in FIG. 5.

In the second embodiment, the moving object information is transmitted to the managing server 4 side only when the moving distance Lm is longer than the predetermined distance L, the startup lock is on, and the engine is off. Thus the second embodiment performs still less number of transmissions in comparison with the first embodiment, and hence, is still more communication cost-efficient than the first embodiment.

In the first embodiment, when the startup lock function is on, the transmission interval of the moving object information is set short so that moving object information is transmitted more frequently, and the managing server 4 is made to evaluate the chance of problems occurring, whereby the management of the moving object is strengthened. On the other hand, in the second embodiment, the moving object monitoring device 10 side also evaluates the chance of problems occurring to some extent by checking whether a plurality of conditions are met. Only when the chance of problems occurring is judged to be high, the result is transmitted to the managing server 4, whereby the burden on the managing server 4 is lessened.

In the descriptions of the first and the second embodiments above, only a case where the startup lock state is triggered by a startup lock command from the managing server 4 side is described. Not being limited to the case above, the present invention can be adopted to any startup lock states mentioned above. For example, the startup lock state may be the one caused by an operation by the user. Further, the present invention is also applicable to the operation lock as well as the engine lock. In the description related to the engine lock, the engine 31 can be replaced by a motor. In this case, the control procedures are to prohibit the rotation of the motor.

Further, in the descriptions of the first and second embodiments above, a system in which the moving object 1 side is connected to the managing server 4 side via the communication satellite 2 is described as an example. Not being limited to the example, the present invention can be applied to other systems as long as the moving object 1 can perform data transmission and reception with a remotely located managing server 4. For example, the system may utilize terrestrial wireless communication, or wireless communication via a commonly-used terrestrial wireless device or via a mobile phone.

The invention claimed is:

1. A moving object monitoring device, which is installed in a moving object to be monitored and transmits moving object information of the moving object to a management unit that controls the moving object, the moving object monitoring device comprising:
    a control unit that controls transmission of the moving object information to the management unit such that a transmission interval of the moving object information, which is applied when a startup lock is activated, is shorter than a transmission interval applied when the startup lock function is deactivated.

2. The moving object monitoring device according to claim 1, wherein the control unit transmits the moving object information when both conditions are satisfied: a moving distance of the moving object is longer than a predetermined distance, and an engine is off.

3. The moving object monitoring device according to claim 1, wherein the startup lock function is a function for prohibiting startup of the moving object in response to a lock command transmitted from the management unit for prohibiting the startup of the moving object.

4. The moving object monitoring device according to claim 1, wherein the startup lock function is one or both of a function for prohibiting startup of an engine of the moving object and a function for prohibiting an operation of a working actuator of the moving object.

5. A moving object monitoring system, which includes a management unit that monitors a moving object to be monitored, and a moving object monitoring device installed in each moving object and transmitting moving object information of the moving object to the management unit, wherein
    the moving object monitoring device includes a control unit that transmits the moving object information to the management unit such that a transmission interval of the moving object information, which is applied when a startup lock is activated, is shorter than a transmission interval applied when the startup lock function is deactivated, and
    the management unit performs an alert process to alert a manager that a problem may have happened to the moving object when the startup lock function is on and no moving object information is received over a predetermined period.

6. The moving object monitoring system according to claim 5, wherein
    the control unit transmits the moving object information when a moving distance of the moving object is longer than a predetermined distance and an engine is off, and
    the management unit performs, upon receiving the moving object information, the alert process to alert the manager that a problem may have happened to the moving object.

7. The moving object monitoring system according to claim 5, wherein
    the management unit transmits to the moving object monitoring device of a specific one of the moving objects, a lock command for prohibiting startup of the specific moving object or a lock deactivation command for deactivating the startup lock function of the specific moving object, and
    the moving object monitoring device of the specific one of the moving objects activates the startup lock function of the specific one of the moving objects in response to the lock command, and deactivates the startup lock function of the specific one of the moving objects in response to the lock deactivation command.

8. The moving object monitoring system according to claim 5, wherein the startup lock function is one or both of a function for prohibiting startup of an engine of the moving object and a function for prohibiting an operation of a working actuator of the moving object.

* * * * *